(12) United States Patent
Hankers et al.

(10) Patent No.: US 9,153,137 B2
(45) Date of Patent: Oct. 6, 2015

(54) TEMPORALLY BASED WEATHER SYMBOLOGY

(75) Inventors: Theo Hankers, Braunschweig (DE); Thorsten Wiesemann, Hofheim (DE)

(73) Assignee: The Boeing Company, Chicago, IL (US)

( * ) Notice: Subject to any disclaimer, the term of this patent is extended or adjusted under 35 U.S.C. 154(b) by 163 days.

(21) Appl. No.: 12/966,617

(22) Filed: Dec. 13, 2010

(65) Prior Publication Data
US 2012/0147030 A1    Jun. 14, 2012

(51) Int. Cl.
| G08G 5/00 | (2006.01) |
| G09B 29/00 | (2006.01) |
| G01W 1/00 | (2006.01) |
| G09B 29/10 | (2006.01) |

(52) U.S. Cl.
CPC ............. *G08G 5/0091* (2013.01); *G01W 1/00* (2013.01); *G08G 5/0013* (2013.01); *G09B 29/006* (2013.01); *G09B 29/10* (2013.01); *G08G 5/0021* (2013.01)

(58) Field of Classification Search
CPC ... G08G 5/0017; G08G 5/006; G08G 5/0047; G08G 5/003; G08G 5/0021; G09B 29/10; G09B 29/006
USPC ............ 345/619, 440, 629, 418, 173; 701/14, 701/16, 538, 213, 517, 528, 423; 709/206; 715/747, 700; 342/26 R; 340/971, 905
See application file for complete search history.

(56) References Cited

U.S. PATENT DOCUMENTS

| 5,265,024 A * | 11/1993 | Crabill et al. ................. 701/538 |
| 5,796,932 A * | 8/1998 | Fox et al. ....................... 715/700 |
| 6,289,277 B1 * | 9/2001 | Feyereisen et al. ........... 701/528 |
| 6,353,794 B1 * | 3/2002 | Davis et al. ................... 701/517 |
| 7,612,688 B1 * | 11/2009 | Vigeant-Langlois et al. 340/971 |
| 2003/0193411 A1 * | 10/2003 | Price ............................. 340/973 |
| 2007/0112511 A1 * | 5/2007 | Burfeind et al. .............. 701/213 |

(Continued)

FOREIGN PATENT DOCUMENTS

| GB | 2488916 A * | 9/2012 |
| WO | 01/25727 A1 | 4/2001 |

OTHER PUBLICATIONS

European Extended Search Report mailed Mar. 30, 2012 in EP Application No. 11193343.8-1232.

(Continued)

*Primary Examiner* — Chante Harrison
(74) *Attorney, Agent, or Firm* — Baldauff IP, LLC; Michael J. Baldauff, Jr.

(57) ABSTRACT

Methods, systems, and computer-readable media are described herein for integrating geo-spatially enabled and time-encoded textual weather information into a graphical map display. Time-encoded textual weather information regarding one or more geographic locations is received, parsed, and interpreted in light of a temporal context of the graphical map display. Weather symbology relating the weather conditions within the temporal context of the graphical map display is generated from the parsed textual weather information and displayed at positions on the map corresponding to the geographic locations. The weather symbology may include weather pictograms that relate past, current, and future weather conditions at the corresponding geographic locations according to the temporal context of the graphical map display.

17 Claims, 6 Drawing Sheets

(56) References Cited

U.S. PATENT DOCUMENTS

| | | | |
|---|---|---|---|
| 2007/0159355 A1* | 7/2007 | Kelly et al. | 340/905 |
| 2008/0158049 A1* | 7/2008 | Southard et al. | 342/26 R |
| 2009/0109065 A1 | 4/2009 | Pinheiro | |
| 2009/0125169 A1* | 5/2009 | Edwards et al. | 701/16 |
| 2009/0237421 A1* | 9/2009 | Kim et al. | 345/173 |
| 2010/0033499 A1* | 2/2010 | Gannon et al. | 345/629 |
| 2010/0265125 A1* | 10/2010 | Kelly et al. | 342/179 |
| 2011/0022294 A1* | 1/2011 | Apley | 345/440 |
| 2011/0102192 A1* | 5/2011 | Batsakes et al. | 340/905 |
| 2011/0246176 A1* | 10/2011 | Arasada | 715/747 |
| 2012/0131111 A1* | 5/2012 | LakkamRaju et al. | 709/206 |
| 2012/0215388 A1* | 8/2012 | Pepitone et al. | 701/14 |
| 2012/0232785 A1* | 9/2012 | Wiesemann et al. | 701/423 |

OTHER PUBLICATIONS

NOAA: Aviation Weather center. Aviation Flight Categories; http://www.aviationweather.gov; Printed Apr. 18, 2011.

Jeppesen: Wx Depiction; http://jeppesen.corn/aviation/personal/aviation-weather.jsp#; Printed Apr. 18, 2011.

Robert A. Prentice et al.; Aviation Weather Services, Advisory Circular, AC 00-45F, Change 2: Oklahoma City, OK: FAA, Mar. 2009.

* cited by examiner

TEMPORALLY BASED WEATHER SYMBOLOGY

BACKGROUND

Weather conditions are a critical part of situational-awareness for a flight crew of an aircraft. Certain weather hazards, such as decreased visibility, increased winds, turbulence, precipitation, increased icing potential, convective weather, and the like, may affect the performance of the aircraft as well as the comfort and safety of passengers. Traditionally, the flight crew receives a pre-flight briefing package prior to a flight that includes current and forecast weather information for departure, destination, and alternate airports, as well as airports along the route. This weather information may be in the form of paper printouts containing textual information as well as 2-D weather maps. Particularly during a long flight, however, this information may become outdated, decreasing the effectiveness of pre-flight weather information in maintaining weather situational-awareness en-route.

The flight crew may have access to updated weather information in-flight through radio communications with air-traffic control ("ATC") or a text-based datalink, such as the Aircraft Communications Addressing and Reporting System ("ACARS"). ACARS is a system for the transmission of short, relatively simple text messaging between aircraft and ground stations via radio or satellite. A pilot may utilize ACARS to request current and forecast weather information regarding a particular airport, as well as to be alerted to significant weather phenomena that affect the safety of all aircraft, such as turbulence, icing, volcanic ash, and the like.

The weather information received via ACARS or other communication, however, is predominately textual in nature. In many cases, the flight crew must mentally map this textual current and forecast weather information to navigational maps covering the aircraft's current route in order to determine any potential impact of the weather conditions. In addition, the flight crew may infer weather trends from the information received at various times during the flight in order to better forecast the conditions that may occur in subsequent portions of the flight. These mental operations may increase the workload of the flight crew, which may be especially critical in certain phases of flight, such as preparation for landing or an emergency diversion, as well as create opportunities for errors to occur.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods, systems, and computer-readable media are described herein for integrating geo-spatially enabled and time-encoded textual weather information into a graphical map display. According to embodiments presented herein, time-encoded textual weather information regarding one or more geographic locations is received, parsed, and interpreted in light of a temporal context of the graphical map display. Weather symbology relating the weather conditions within the temporal context of the graphical map display is generated from the parsed textual weather information and displayed at positions on the map corresponding to the geographic locations. In one embodiment, the weather symbology comprises weather pictograms that relate past, current, and future weather conditions at the corresponding geographic locations according to the temporal context of the graphical map display.

The features, functions, and advantages discussed herein can be achieved independently in various embodiments of the present invention or may be combined in yet other embodiments, further details of which can be seen with reference to the following description and drawings.

DETAILED DESCRIPTION

Figure 1:
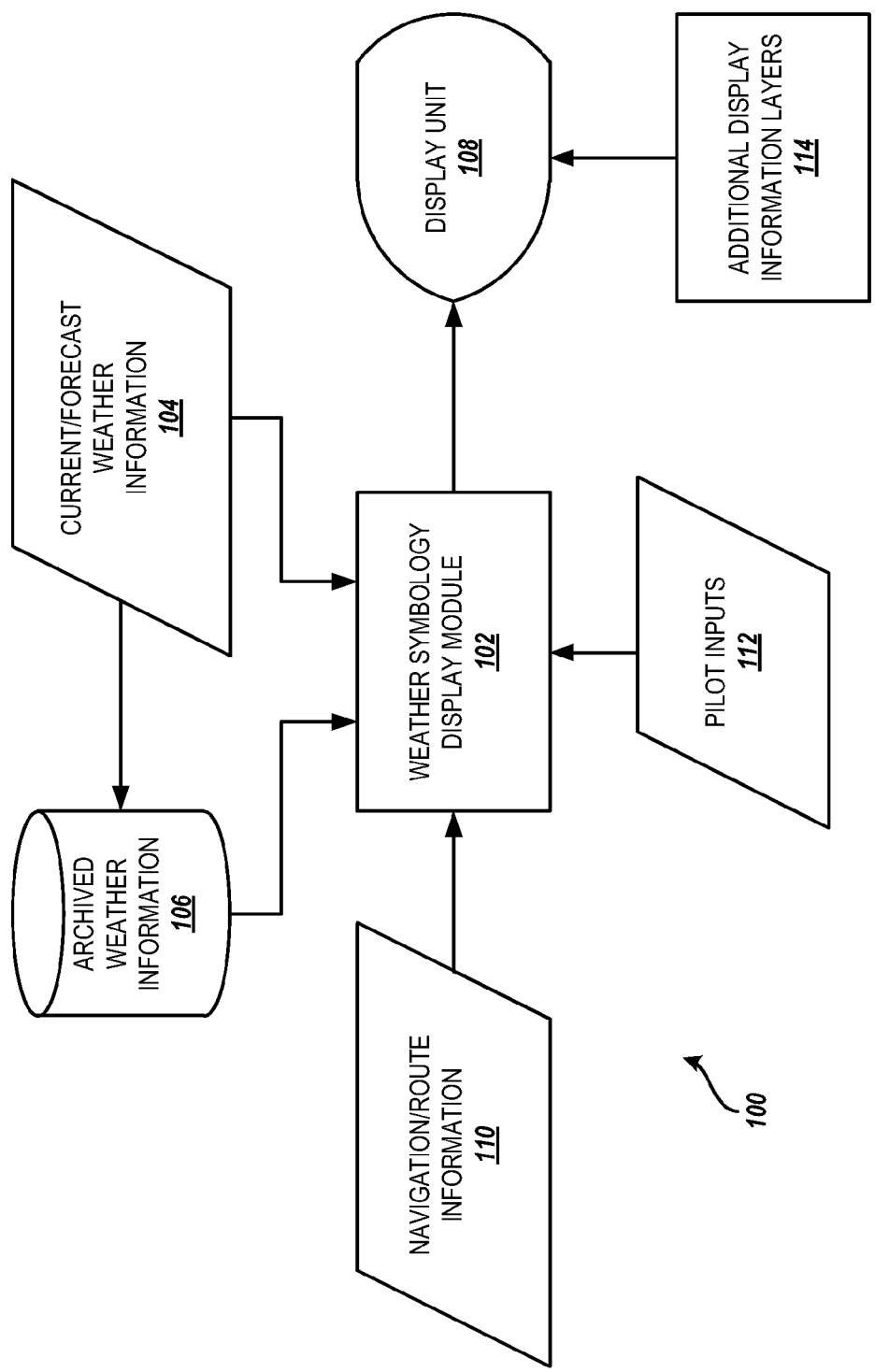
FIG. 1 is a block diagram illustrating various aspects of a weather symbology display system of an aircraft, according to embodiments presented herein.

The following detailed description is directed to methods, systems, and computer-readable media for integrating geo-spatially enabled and time-encoded textual weather information into a graphical map display. Utilizing the concepts and technologies described herein, current and forecast textual weather information received at an aircraft may be parsed, interpreted, and graphically depicted in a graphical map display using symbology that intuitively shows current weather conditions as well as past and future trends. Automatically parsing the geo-spatially enabled textual weather information and displaying the information graphically on the map increases the weather situational-awareness of the flight crew of the aircraft while reducing their workload and reducing errors in interpretation of the information. These and other advantages and features will become apparent from the description of the various embodiments below.

In the following detailed description, references are made to the accompanying drawings that form a part hereof and that show, by way of illustration, specific embodiments or examples. In referring to the drawings, like numerals represent like elements throughout the several figures.

FIG. 1 shows various aspects of a weather symbology display system 100 having the capability to integrate geo-spatially enabled and time-encoded textual weather information into a graphical map display, according to embodiments. In one embodiment, the weather symbology display system 100 is an integrated component of a flight management system ("FMS"), an aeronautical operational control ("AOC") application, and/or other cockpit avionics systems of an aircraft. In other embodiments, the weather symbology display system 100 may be implemented in a ground-based computing system of an airline's operation center, an air navigation service provider ("ANSP"), or ATC. The weather symbology display system 100 may further be implemented in an individual computing device, such as a controller's workstation, a desktop personal computer ("PC"), a laptop, a notebook, a hand-held device, and the like.

The weather symbology display system 100 includes a weather symbology display module 102. As will be described in detailed herein, the weather symbology display module 102 receives current/forecast weather information 104, parses the information, interprets it, and displays corresponding temporally based weather symbology depicting past, current, and future weather conditions on a display unit 108 accessible by the weather symbology display system 100. The weather symbology display module 102 may be implemented as software, hardware, or a combination of the two and may execute on one or more processors or computing devices within the weather symbology display system 100.

According to embodiments, the current/forecast weather information 104 includes geo-spatially enabled textual information regarding weather conditions at a specific geographic locations or regions. The current/forecast weather information 104 is further time-encoded, i.e., the information regards weather conditions in the context of a specific point-in-time or period. In one embodiment, the weather symbology display module 102 receives current/forecast weather information 104 in the form of short text messages containing weather reports received via ACARS or some other messaging system in the cockpit.

The text-based weather reports may include aviation routine weather reports or aerodrome routine meteorological reports, referred to as "METAR" reports, periodically broadcast by airports or permanent weather observation stations. METAR reports contain encoded information regarding current weather conditions at the airport or station, such as wind speed and direction, visibility, cloud ceiling, temperature, dew point, barometric pressure, and the like. A METAR report may also contain information on precipitation amounts, lightning, runway visual range, and other information that would be of particular interest to the flight crew of an aircraft. METAR reports are typically generated once an hour, but if conditions change significantly, they can be updated in special interim reports (referred to as "SPECI" reports).

METAR reports contain the reported weather information at the airport encoded in a global standard format, although minor differences between codes, abbreviations, units, and other variations may occur between countries. Table 1 shows an example METAR report for Chicago-O'Hare airport ("KORD") broadcast on the 9$^{th}$ day of the month at 11:00 UTC ("091100Z"). The METAR reports winds from 080° at 3 knots ("08003KT"), visibility of 1 statute-mile ("1SM"), light mist ("BR"), broken cloud layer at 500 feet above ground ("BKN005"), temperature of 1° C. with a dewpoint at 0° ("01/00"), and an altimeter setting of 29.90 in Hg.

TABLE 1

Example METAR Text-based Weather Report

METAR KORD 091100Z 08003KT 1SM BR BKN005 01/00 A2990=

Similarly, Table 2 shows an updated weather report ("SPECI") for Chicago-O'Hare Airport ("KORD") broadcast at 12:00 UTC on the same day ("091100Z"), reporting winds now from 060° at 5 knots ("06005KT"), visibility of 2 statute-miles ("2SM"), light mist ("BR"), broken cloud layer at 1000 feet above ground ("BKN010"), temperature of 4° C. with a dewpoint at 1° ("04/01"), and a new altimeter setting of 29.91 in Hg.

TABLE 2

Example SPECI Text-based Weather Report

SPECI KORD 091200Z 06005KT 2SM BR BKN010 04/01 A2991=

The text-based weather reports may also include terminal area forecasts ("TAFs") periodically broadcast by airports in conjunction with the METAR and SPECI reports. TAFs contain forecast information for a five statute-mile radius around the airport, and may apply to a 12, 24, or 30 hour forecast period. Similar to METAR reports, TAFs contain encoded information regarding forecasted conditions in a specified time period according to a standard format. For example, Table 3 shows an example TAF for Chicago-O'Hare airport ("KORD") broadcast on the 9$^{th}$ day of the month at 10:30 UTC ("091030Z") and valid from 11:00 that day to 18:00 the next day. The TAF initially forecasts winds from 080° at 5 knots ("08005KT"), visibility of one-half statute miles ("½SM"), light mist ("BR"), and a solid or overcast cloud layer at 500 feet above ground ("OVC005").

TABLE 3

Example TAF Text-based Weather Forecast

TAF KORD 091030Z 0911/1018 08005KT 1/2SM BR OVC005
FM091200 07005KT 1SM BR OVC008
FM091300 06005KT 4SM BKN015=

Each of the follow-on lines indicates a new forecast period. For example, at 12:00 UTC ("FM091200"), the TAF forecasts winds changing to 070° at 5 knots ("07005KT"), visibility of one statute-mile ("1SM"), light mist ("BR"), and an overcast cloud layer at 800 feet above ground ("OVC008"). Similarly, at 13:00 UTC ("FM091300"), the TAF forecasts winds changing to 060° at 5 knots ("06005KT"), visibility of four statute-miles ("4SM"), and a broken cloud layer at 1500 feet ("BKN015"). The TAF may contain any number of forecast statements for different periods for the reporting airport or observation station.

It will be appreciated that other sources of geo-spatially enabled and time-encoded textual current/forecast weather information 104 may be available to the weather symbology display module 102 beyond the METAR reports, SPECI reports, and TAFs described above. For example, the current/forecast weather information 104 may include significant meteorological information ("SIGMET") advisories or pilot reports ("PIREPs") regarding meteorological information concerning the safety of all aircraft, such as thunderstorms (convective weather), turbulence, icing, volcanic ash, and the like. It is intended that this disclosure include all such sources of geo-spatially enabled and time-encoded textual current/forecast weather information 104.

The METAR reports, SPECI reports, TAFs, SIGMET advisories, PIREPs, and other geo-spatially enabled and time-encoded textual current/forecast weather information 104 may be received by the weather symbology display module 102 via ACARS or other datalink from the reporting airports or observation stations, or through a central reporting service, such as the Aviation Digital Data Service ("ADDS") operated by the National Oceanic and Atmospheric Administration ("NOAA"). In one embodiment, the weather symbology display module 102 requests and receives text-based weather reports from airports related to the current route of the aircraft, such as the departure airport, the destination airport, one or more alternate airports, as well as other airports or ground stations along the current route.

Alternatively or additionally, the weather symbology display module 102 may receive all text-based weather reports and advisories issued over a broadcast feed, such as satellite feed from SIRIUS XM RADIO, Inc. of New York, N.Y. It will be appreciated that any number of datalinks, communication channels, and communication methods may be utilized by the weather symbology display module 102 to receive the current/forecast weather information 104, and it is intended that this disclosure include all such datalinks, communication channels, and communication methods.

According to a further embodiment, the weather symbology display module 102 or another component of the weather symbology display system 100 saves the received current/forecast weather information 104 to a datastore as archived weather information 106. The archived weather information 106 may be stored in a storage system or database of the FMS, AOC application, or other avionics system of the aircraft. The weather symbology display module 102 may utilize the archived weather information 106 in conjunction with the current/forecast weather information 104 in displaying the temporally based weather symbology regarding the past, current, and future weather conditions on the display unit 108, as will be described in more detail below. The display unit 108 may be located in the cockpit of the aircraft and may be a graphical display, such as an electronic flight bag ("EFB") display, a multi-function display ("MFD"), or a heads-up display ("HUD") found in a modern "glass cockpit." Alternatively, the display unit 108 may be a computer monitor, a laptop computer display, a handheld display, or other suitable display device accessible by the weather symbology display system 100.

In one embodiment, the weather symbology display module 102 displays the temporally based weather symbology in conjunction with the display of a flight route of the aircraft, as will be described below in regard to FIGS. 3-4B. The weather symbology display module 102 may have access to navigation/route information 110 containing data regarding the flight route, such as the departure airport, the destination airport, one or more alternate airports, as well as airports or other ground stations along the flight route.

The navigation/route information 110 may further contain additional data regarding the navigation of the aircraft, including navigation waypoints, point locations of known hazards, geographic maps, topography maps, satellite maps, and the like. The weather symbology display module 102 may display the temporally based weather symbology in conjunction with additional display information layers 114 displayed by other modules in the weather symbology display system 100, the FMS, the AOC application, or other avionics systems of the aircraft. For example, the temporally based weather symbology may be displayed in conjunction with a graphical map display shown on the display unit 108.

In another embodiment, the weather symbology display module 102 may receive pilot inputs 112 from the flight crew of the aircraft or other user that affect the display of the temporally based weather symbology on the display unit 108. The pilot inputs 112 may be received from an electronic flight information system ("EFIS") control panel, a display select panel ("DSP"), a multi-function control and display unit ("MCDU"), an EFB, or other input controls or data terminals. Pilot inputs 112 may include a selection of the specific display unit 108 in the cockpit on which to display the temporally based weather symbology, identification of the current or proposed flight routes to include in the display, selection of the type of weather symbology to be utilized, a color-coding scheme with which to display the symbology, a range selection for the display, a mode selection for the display, and the like.

Figure 2:
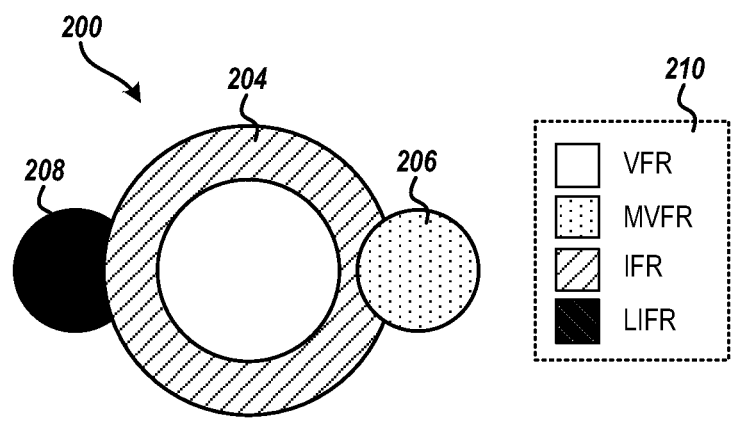
FIG. 2 is diagram showing an illustrative temporal-based encoded weather pictogram, according to embodiments presented herein.

FIG. 2 illustrates one example of temporally based weather symbology displayed by the weather symbology display module 102, according to one embodiment. The temporally based weather symbology may comprise a weather pictogram 200 displayed on the display unit 108 at a position corresponding to a specific geographic location, for example. According to embodiments, the weather pictogram 200 includes three graphical elements 204, 206, and 208, corresponding to current, future, and past weather conditions at the location, respectively. Each of the graphical elements 204, 206, and 208 of the weather pictogram 200 may be color-coded, shaded, or otherwise styled to relate the weather conditions in the context of the corresponding time period. The weather symbology display module 102 may determine the color-coding, shading, or styling utilized for each of the graphical elements 204, 206, and 208 based on a relative evaluation of corresponding weather conditions, as parsed and interpreted from the current/forecast weather information 104 and the archived weather information 106.

According to one embodiment, the weather pictogram 200 includes a first graphical element 204 consisting of a center ring, color-coded to relate the current weather conditions at the corresponding geographic location; a second graphical element 206 consisting of a circle in front of and adjacent to the center ring and color-coded to relate the future weather conditions at the location; and a third graphical element 208 consisting of a circle behind and adjacent to the center ring corresponding to the past weather conditions at the location, as shown in FIG. 2. The weather symbology display module 102 may color-code or shade the graphical elements 204, 206, and 208 based on rules or schemes established by international standards, regional aviation authorities, airline operation rules, or the like.

In one embodiment, the graphical elements 204, 206, and 208 are color-coded based upon Federal Aviation Administration ("FAA") established flight rules and associated colors, as shown at 210 in FIG. 2. The weather symbology display module 102 may parse the cloud ceiling and visibility information from the METAR reports, SPECI reports, and TAFs comprising the current/forecast weather information 104 and the archived weather information 106, and utilize the defined categories shown in Table 4 to determine the color for shading the graphical elements 204, 206, and 208 of the weather pictogram 200. For example, the weather pictogram 200 shown in FIG. 2 may represent the past, current, and future weather conditions of Chicago-O'Hare airport as established at 12:00 UDT by the highlighted portions of the METAR report, the SPECI report, and the TAF described above and shown in Table 1, Table 2, and Table 3, respectively, according to the enumerated FAA flight rules provided in Table 4.

TABLE 4

FAA Flight Condition Rules and Display Colors

| Category | Color | Ceiling | Visibility |
|---|---|---|---|
| Low Instrument Flight Rules ("LIFR") | Magenta | below 500 feet | and/or less than 1 mile |
| Instrument Flight Rules ("IFR") | Red | 500 to 1,000 feet | and/or 1 to 3 miles |
| Marginal Visual Flight Rules ("MVFR") | Blue | 1,000 to 3,000 feet | and/or 3 to 5 miles |

TABLE 4-continued

FAA Flight Condition Rules and Display Colors

| Category | Color | Ceiling | Visibility |
| --- | --- | --- | --- |
| Visual Flight Rules ("VFR") | Green | greater than 3,000 feet and | greater than 5 miles |

It will be appreciated that the weather symbology display module 102 may utilize other color-coding, shading, or styling schemes beyond those described above. For example, the weather symbology display module 102 may color-code the graphical elements 204, 206, and 208 green, yellow, or red to symbolize good conditions, moderate or worsening conditions, and poor conditions, respectively. The relevant conditions may be based on any combination of past, current, and future wind speeds, temperature, visibility, precipitation, convective weather, icing potential, airborne hazards, cloud base, aircraft limits, and the like, available to the weather symbology display module 102 from the current/forecast weather information 104. It is intended that this disclosure include all such color-coding, shading, or styling schemes. In a further embodiment, the flight crew of the aircraft may select the desired color-coding or shading scheme for the weather pictogram 200 through the use of pilot inputs 112 described above.

Figure 3:
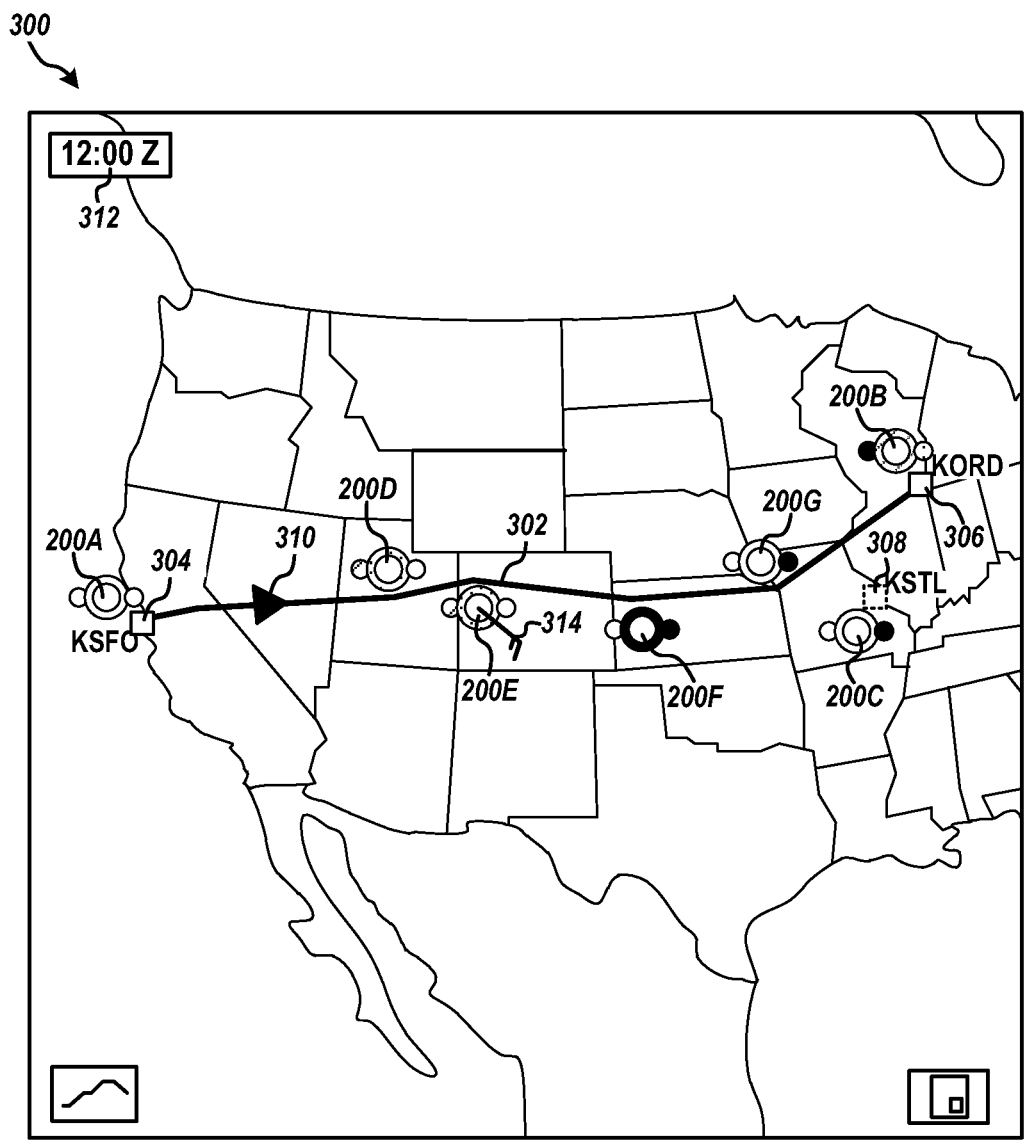
FIG. 3 is display diagram showing an illustrative graphical map display including integrated, temporally based weather symbology, according to embodiments presented herein.

FIG. 3 is a display diagram showing a flight route display 300 as displayed on a display unit 108 accessible to the weather symbology display system 100, such as the EFB display in the cockpit of the aircraft. The flight route display 300 may show a line indicating a flight route 302 from the departure airport 304 to the destination airport 306 overlayed on a geographical map. The flight route display 300 may also show one or more alternate airports 308, as well as a current position indicator 310 indicating the current position of the aircraft along the flight route 302. The flight route display 300 may further include a current time indicator 312 showing the current time of the display.

According to embodiments, the flight route display 300 may also include temporally based weather symbology displayed by the weather symbology display module 102 on the display unit 108. For example, as shown in FIG. 3, the weather symbology display module 102 may display a weather pictogram 200A associated with the departure airport 304, a weather pictogram 200B associated with the destination airport, a weather pictogram 200C associated with alternate airport 308, as well as any number of weather pictograms 200D-200G associated with airports or ground stations along the flight route 302. Each of the weather pictograms 200A-200G indicates the past, current, and future weather conditions of the associated geographic location as of the current time of the flight route display 300, as determined by the weather symbology display module 102 from the current/forecast weather information 104 and the archived weather information 106. In a further embodiment, the temporally based weather symbology may be displayed by the weather symbology display module 102 in addition to traditional weather indicators, such as the wind barb shown at 314, at some or all of the associated geographic locations.

Figure 4A:
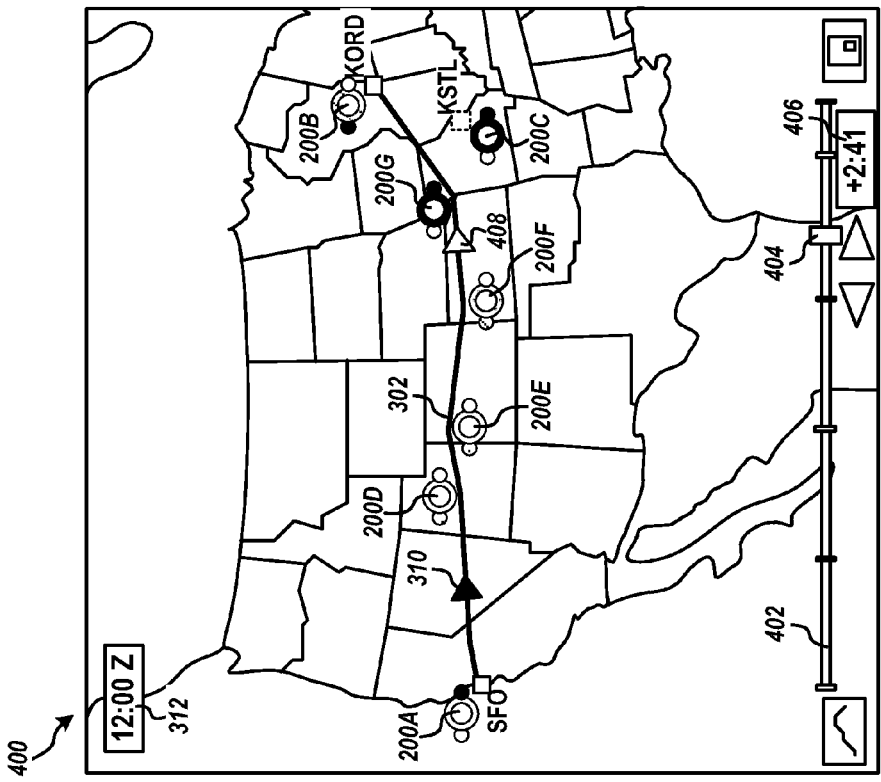
FIGS. 4A and 4B are display diagrams showing changes to the integrated, temporally based weather symbology in the graphical map display resulting from a change to the temporal context of the display, according to embodiments presented herein.
Figure 4B:
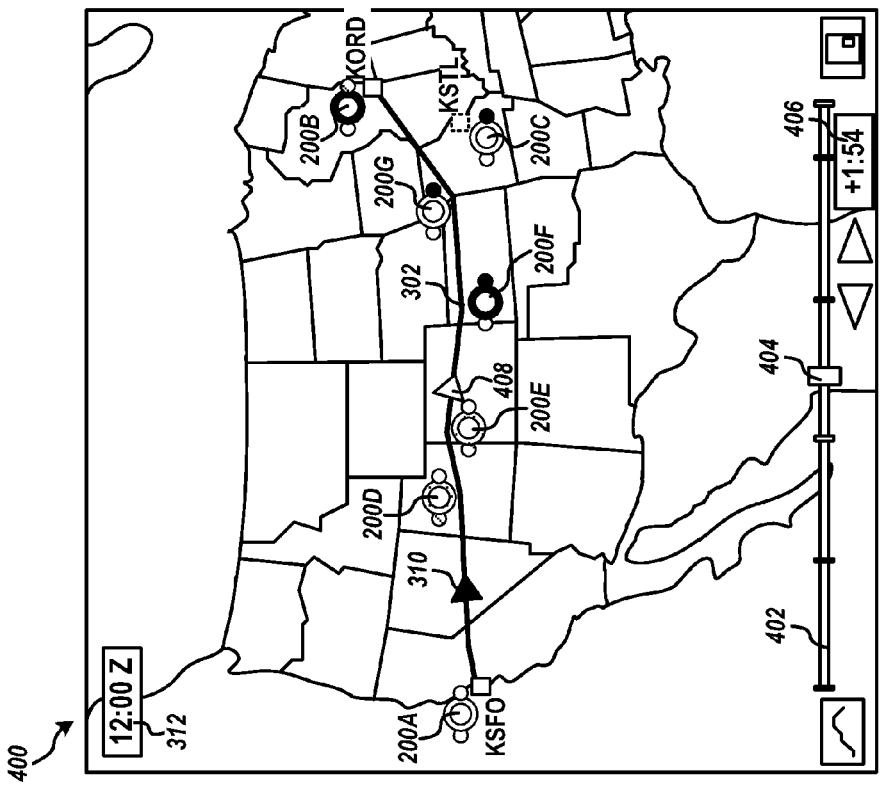

FIGS. 4A and 4B show another example of a flight route display 400 that allows the flight crew of the aircraft or other user to modify the temporal context of the display and project the flight route and associated temporally based weather symbology into the future. The flight route display 400 includes a timeline user-interface ("UI") control 402 and associated slider UI control 404. The timeline UI control 402 may correspond to the time of flight along the flight route 302 shown in the flight route display 400. The user may use the associated slider UI control 404 to change the temporal context of the flight route display 400. The flight route display 400 may further include a projected time indicator 406 indicating the position of the slider UI control 404 along the timeline UI control 402 relative to the current time of the flight route display 400, as indicated by the current time indicator 312. The flight route display 400 also includes the current position indicator 310 indicating the position of the aircraft at the current time of the flight route display, as well as a projected position indicator 408 indicating the estimated position of the aircraft at the projected time.

According to embodiments, the weather symbology display module 102 displays the weather pictograms 200A-200G on the flight route display 400 to indicate the past, current, and future weather conditions at the associated geographic locations as of the projected time, as determined from the current/forecast weather information 104 and the archived weather information 106. For example, as shown in FIG. 4A, the slider UI control 404 has been positioned along the timeline UI control 402 such that the temporal context of the flight route display 400 is one hour and 54 minutes into the future, as indicated by the projected time indicator 406. Accordingly, the projected position indicator 408 indicates the estimated position of the aircraft along the flight route 302 at 13:54 UDT, and each of the weather pictograms 200A-200G indicates the past, current, and future weather conditions at the associated geographic locations as of 13:54 UDT.

Similarly, as shown in FIG. 4B, the slider UI control 404 has been positioned such that the temporal context of the flight route display 400 is two hours and 41 minutes in the future. The projected position indicator 408 shows the estimated position of the aircraft along the flight route 302 as of 14:41 UDT, and the weather pictograms 200A-200G indicate the past, current, and future weather conditions at the associated geographic locations as of 14:41 UDT. In one embodiment, the weather symbology display module 102 parses and interprets the METAR reports, SPECI reports, TAFs, SIGMET advisories, PIREPs, and/or other textual weather information comprising the current/forecast weather information 104 and the archived weather information 106 to determine color-coding or shading of each graphical element 204, 206, and 208 of the weather pictograms 200A-200G shown on the flight route display 400 as of the projected time.

It will be appreciated that the temporally based weather symbology displayed by the weather symbology display module 102 may include pictograms and/or graphical elements in other configurations beyond those shown in FIGS. 2-4B. For example, the temporally based weather symbology may include weather pictograms comprising horizontal or vertical bars consisting of three graphical elements, each corresponding to current, future, and past weather conditions at the geographic location associated with the position of the bar in the display. It is intended that this disclosure include all such pictograms and/or graphical elements.

In a further embodiment, the user may be able to select one of the weather pictograms 200A-200G shown on the graphical map display, such as the flight route display 300, 400, using a movable cursor, stylus, touchscreen, or other input device in order to view the textual weather information, such as the METAR reports, SPECI reports, or TAFs, utilized by the weather symbology display module 102 to generate the selected weather pictogram. It will be further appreciated that the temporally based weather symbology may be displayed by the weather symbology display module 102 in conjunction with other graphical map displays shown on the display unit 108, such as a NAV display or a moving map display commonly found on modern aircraft cockpit displays, for example.

Figure 5:
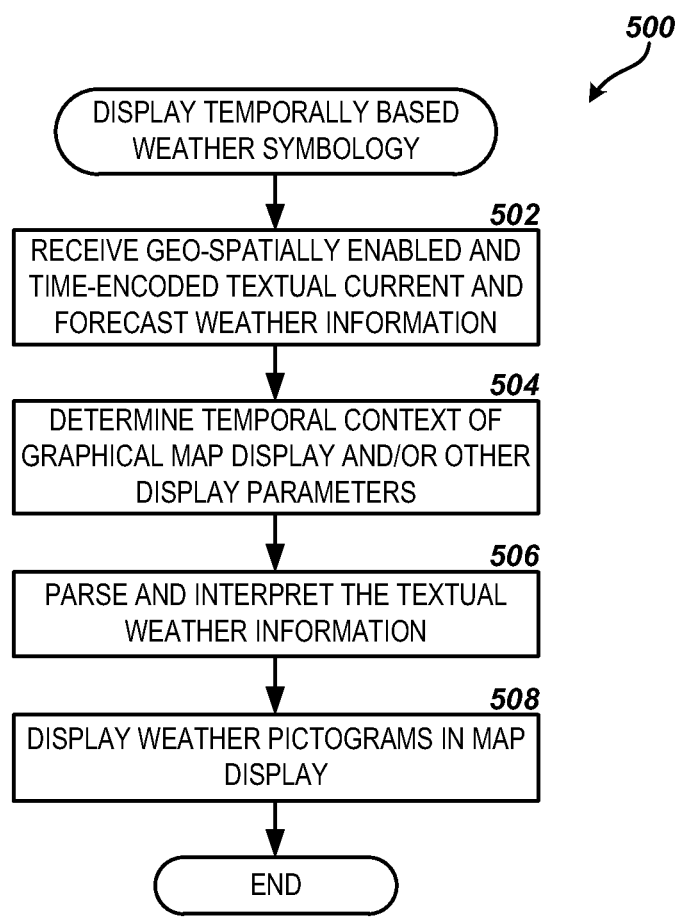
FIG. 5 is a flow diagram illustrating one method for integrating geo-spatially enabled and time-encoded textual weather information into a graphical map display, as provided in the embodiments presented herein.

Turn now to FIG. 5, additional details will be provided regarding embodiments presented herein for integrating geo-spatially enabled and time-encoded textual weather information into a graphical map display. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts, and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 5 shows a routine 500 for displaying temporally based weather symbology on a graphical map. For example, the routine 500 may be utilized to display the weather pictograms 200A-200G in conjunction with a flight route display 300, 400 shown on a display unit 108, as described above in regard to FIGS. 3-4B. In one embodiment, the routine 500 is performed by the weather symbology display module 102 described above in regard to FIG. 1. It will be appreciated that the routine 500 may also be performed by another module or component of the weather symbology display system 100, or by any combination of modules and components.

The routine 500 begins at operation 502, where the weather symbology display module 102 receives geo-spatially enabled and time-encoded current/forecast weather information 104. For example, the weather symbology display module 102 may receive METAR reports, SPECI reports, TAFs, SIGMET advisories, PIREPs, and/or other textual weather information regarding the departure airport, the destination airport, and/or other airports or ground stations along a current flight route of the aircraft. The current/forecast weather information 104 may be received via ACARS, a satellite feed, another datalink, or any combination thereof. In addition, the weather symbology display module 102 may store the received current/forecast weather information 104 in a datastore as archived weather information 106, as further described above and regarded FIG. 1. It will be appreciated that, in situations where the flight route display 300, 400 is being utilized in conjunction with pre-flight planning and not en route, the current flight route may represent a currently selected or assigned primary route for the aircraft.

From operation 502, the routine 500 proceeds to operation 504, where the weather symbology display module 102 determines the temporal context of the graphical map display as well as other display parameters. For example, the weather symbology display module 102 may determine the current time and/or projected time of the flight route display 300, 400 as well as the zoom level of the display, the scope of the display, geographic locations of airports or other ground stations shown in the display, and the like. In addition, the weather symbology display module 102 may further determine a currently selected color-coding or shading scheme selected for the display of the weather symbology, as indicated by pilot inputs 112, default configuration settings, airline or regional aviation authority requirements, or the like.

The routine 500 proceeds from operation 504 to operation 506, where the weather symbology display module 102 parses and interprets the received textual current/forecast weather information 104 within the temporal context of the graphical map display. For example, the weather symbology display module 102 may parse the past, current, and forecast weather reports for the geographic locations of interest shown in the graphical map display as of the current time or projected time from the METAR reports, SPECI reports, TAFs, SIGMET advisories, PIREPs, and/or other textual weather information comprising the current/forecast weather information 104 and archived weather information 106.

The parsed weather reports may then be interpreted in the context of the selected color-coding, shading, or styling scheme to determine the category or other indicator of relevant weather condition for the graphical elements 204, 206, 208 of each weather pictogram 200 to display. For example, in order to generate a weather pictogram 200 corresponding to FAA flight rules at Chicago-O'Hare airport at 12:00 UDT on the ninth day of the month, the weather symbology display module 102 may determine the color-coding or shading for the first graphical element 204 of the pictogram (current conditions) from the highlighted portions of the SPECI report shown above in Table 2, the color-coding or shading for the second graphical element 206 of the pictogram (future conditions) from the highlighted portions of the TAF shown above in Table 3, and the color-coding or shading for the third graphical element 208 of the pictogram (past conditions) from the highlighted portions of the METAR report shown in Table 1.

From operation 506, the routine 500 proceeds to operation 508, where the weather symbology display module 102 displays the weather pictograms 200 on the graphical map display shown on the display unit 108. For example, the weather symbology display module 102 may display weather pictograms 200A-200G at locations in the flight route display 300, 400 corresponding to the geographic location of the airports or other ground stations shown in the display in the manner described above in regard to FIGS. 3-4B. From operation 508, the routine 500 ends. It will be appreciated that as the temporal context or other parameters of the graphical map display change, such as the current or projected time, the zoom level, and/or the scope of the display (as in the NAV display or moving map display of an aircraft en route), the weather symbology display module 102 may repeat the routine 500 to update the displayed temporally based weather symbology from the latest received current/forecast weather information 104.

Figure 6:
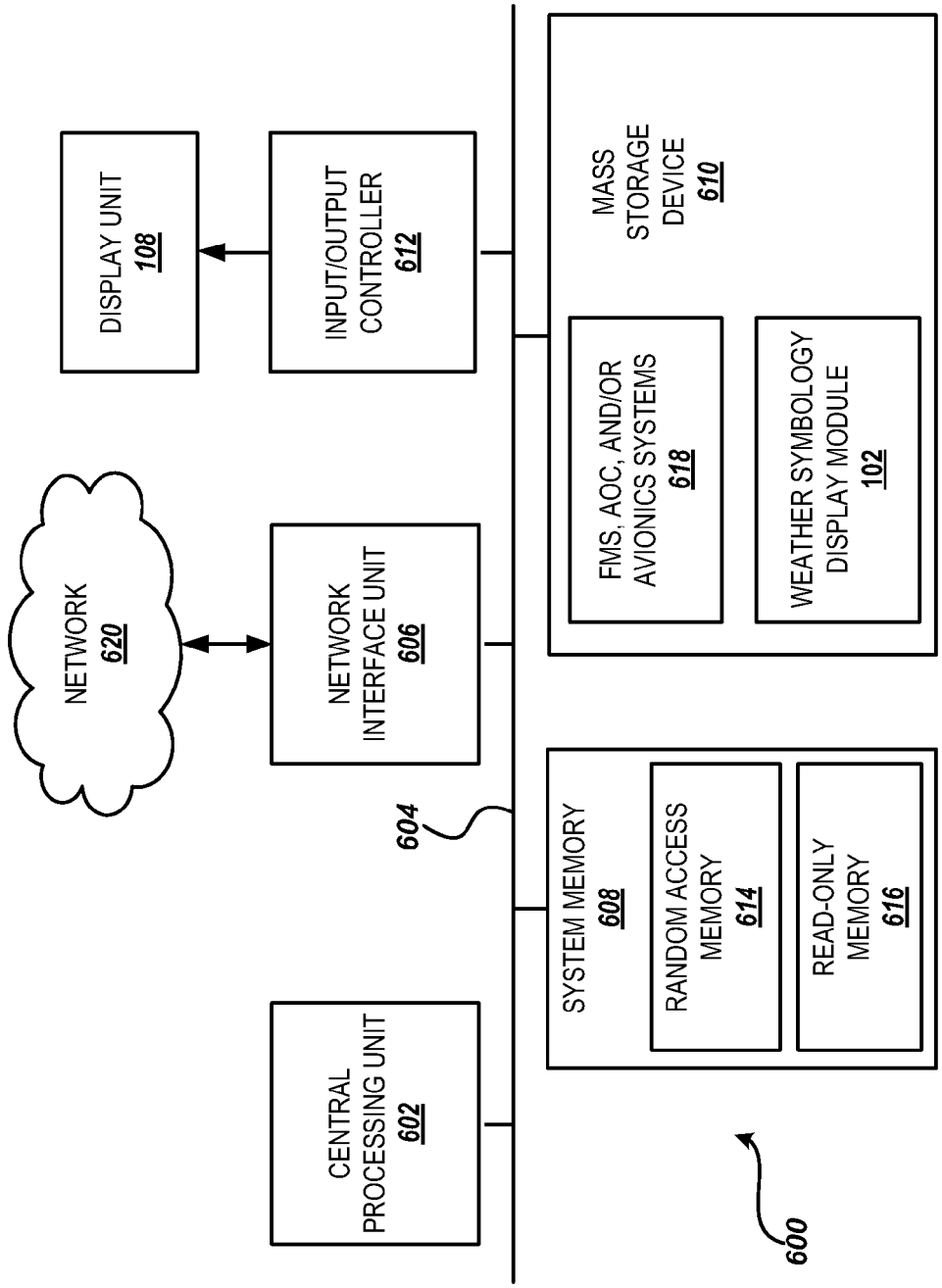
FIG. 6 is a block diagram showing an illustrative computer hardware and software architecture for a computing system capable of implementing aspects of the embodiments presented herein.

FIG. 6 shows an illustrative computer 600 capable of executing the software components described herein for integrating geo-spatially enabled and time-encoded textual weather information into graphical map displays, in the manner presented above. The computer 600 may be embodied in single computing device or in a combination of one or more processing units, storage units, and/or other computing devices implemented in the avionics systems of an aircraft, in ground-based computer systems, or a combination of the two. The computer 600 includes one or more central processing units 602 ("CPUs"), a system memory 608, including a random access memory 614 ("RAM") and a read-only memory 616 ("ROM"), and a system bus 604 that couples the memory to the CPUs 602.

The CPUs 602 may be standard programmable processors that perform arithmetic and logical operations necessary for the operation of the computer 600. The CPUs 602 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer 600 also includes a mass storage device 610. The mass storage device 610 may be connected to the CPUs 602 through a mass storage controller (not shown) further connected to the bus 604. The mass storage device 610 and its associated computer-readable media provide non-volatile, non-transitory storage for the computer 600. The mass storage device 610 may store an FMS, and AOC application, and other avionics systems 618, as well as specific application modules or other program modules, such as the weather symbology display module 102 described above in regard to FIG. 1. The mass storage device 610 may also store data collected or utilized by the various systems and modules, such as the archived weather information 106.

The computer 600 may store programs and data on the mass storage device 610 by transforming the physical state of the mass storage device to reflect the information being stored. The specific transformation of physical state may depend on various factors, in different implementations of this disclosure. Examples of such factors may include, but are not limited to, the technology used to implement the mass storage device 610, whether the mass storage device is characterized as primary or secondary storage, and the like. For example, the computer 600 may store information to the mass storage device 610 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer 600 may further read information from the mass storage device 610 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer media that can be accessed by the computer 600. Computer-readable media includes communication media, such as signals, and computer-readable storage media. By way of example, and not limitation, computer-readable storage media includes volatile and non-volatile, removable and non-removable media implemented in any method or technology for the storage of information, such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information in a non-transitory fashion and which can be accessed by the computer 600. According to one embodiment, the computer 600 may have access to computer-readable storage media storing computer-executable instructions that, when executed by the computer, perform the routine 500 for displaying temporally based weather symbology on a graphical map display, as described above in regard to FIG. 5.

According to various embodiments, the computer 600 may operate in a networked environment using logical connections to other avionics in the aircraft through a network, such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for providing output to aircraft terminals and displays, such as the display unit 108 described above in regard to FIG. 1. Similarly, the input/output controller 612 may provide output to other displays, such as a computer monitor, a printer, or other type of output device. The input/output controller 612 may further receive input from devices, such as an MCDU, an EFIS control panel, a DSP, a keyboard, mouse, electronic stylus, or touch screen associated with the display unit 108, and the like. It will be further appreciated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for integrating geo-spatially enabled and time-encoded textual weather information into a graphical map display are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium comprising computer-executable instructions that, when executed by a computer, cause the computer to:
   receive weather information regarding a first geographic location and a second geographic location along a flight route;
   receive a selection of a projected time of flight via a timeline user-interface control, the projected time of flight corresponding to a time at which an aircraft is flying the flight route and is not positioned at the first geographic location or the second geographic location;
   parse and interpret the received weather information to determine weather conditions at the first geographic location and the second geographic location at the projected time of flight selected via the timeline user-interface control; and
   display a first weather pictogram at a position on the graphical map display corresponding to the first geographic location and a second weather pictogram at a position on the graphical map display corresponding to the second geographic location, wherein the first weather pictogram comprises a first graphical element depicting past weather conditions at the first geographic location at the projected time of flight, a second graphical element adjacent to and abutting the first graphical element and depicting current weather conditions at the first geographic location at the projected time of flight, and a third graphical element adjacent to and abutting the second graphical element and depicting forecasted future weather conditions at the first geographic location at the projected time of flight.

2. The non-transitory computer-readable storage medium of claim 1, wherein the first graphical element indicates the current weather conditions through a color-coding or shading associated with the current weather conditions, the second graphical element indicates the current weather conditions through a color-coding or shading associated with the future weather conditions, and the third graphical element indicates the past weather conditions through a color-coding or shading associated with the past weather conditions.

3. The non-transitory computer-readable storage medium of claim 2, wherein the color-coding or shading associated with the current weather conditions, the future weather conditions, and the past weather conditions indicates flight rules in effect at the geographic location based on the current weather conditions, the future weather conditions, and the past weather conditions respectively.

4. The non-transitory computer-readable storage medium of claim 1, wherein the weather information comprises a plurality of METAR reports, SPECI reports, terminal area forecasts ("TAFs"), significant meteorological information ("SIGMET") advisories, or pilot reports ("PIREPs") regarding the geographic location.

5. The non-transitory computer-readable storage medium of claim 1, wherein the weather information is received via the Aircraft Communications Addressing and Reporting System ("ACARS").

6. The non-transitory computer-readable storage medium of claim 1, wherein each weather pictogram is displayed in conjunction with a flight route display.

7. A system for integrating weather information into a graphical map display of an aircraft, the system comprising:
   a display unit in a cockpit of the aircraft;
   a memory for storing a program containing computer-executable instructions for displaying weather symbology on the display unit; and
   a processing unit functionally coupled to the memory and the display unit, the processing unit being responsive to the computer-executable instructions and configured to:
   receive weather information regarding a geographic location;
   receive a request for weather conditions at the geographic location according to a first selected point-in-time of a plurality of points-in-time associated with a position of the aircraft within a flight route, the first selected point-in-time corresponding to a time at which the aircraft is flying the flight route and is not positioned at the geographic location;
   determine a temporal context of the graphical map display, the temporal context comprising the first selected point-in-time;
   parse and interpret the received weather information to determine weather conditions at the geographic location based upon the temporal context of the graphical map display according to the first selected point-in-time;
   display a weather pictogram at a position on the graphical map display corresponding to the geographic location, wherein the weather pictogram relates the weather conditions at the geographic location within the temporal context of the graphical map display according to the first selected point-in-time and comprises a first graphical element depicting past weather conditions at the geographic location at the first selected point-in-time, a second graphical element adjacent to and abutting the first graphical element and depicting current weather conditions at the geographic location at the first selected point-in-time, and a third graphical element adjacent to and abutting the second graphical element and depicting forecasted future weather conditions at the geographic location at the first selected point-in-time;
   receive a request for weather conditions at the geographic location according to a second selected point-in-time of the plurality of points-in-time associated with the position of the aircraft within the flight route;
   parse and interpret the received weather information to determine weather conditions at the geographic location based upon the temporal context of the graphical map display according to the second selected point-in-time; and
   display the weather pictogram at a position on the graphical map display corresponding to the geographic location, wherein the weather pictogram is updated to reflect the weather conditions at the geographic location within the temporal context of the graphical map display according to the second selected point-in-time.

8. The system of claim 7, wherein the first graphical element indicates the current weather conditions through a color-coding or shading associated with the current weather conditions, the second graphical element indicates the current weather conditions through a color-coding or shading associated with the future weather conditions, and the third graphical element indicates the past weather conditions through a color-coding or shading associated with the past weather conditions.

9. The system of claim 8, wherein the color-coding or shading associated with the current weather conditions, the future weather conditions, and the past weather conditions indicates flight rules in effect at the geographic location based on the current weather conditions, the future weather conditions, and the past weather conditions respectively.

10. The system of claim 7, wherein the weather information comprises a plurality of METAR reports, SPECI reports, TAFs, SIGMET advisories, or PIREPs regarding the geographic location.

11. The system of claim 7, wherein the weather information is received at the aircraft via ACARS.

12. The system of claim 7, wherein the weather pictogram is displayed in conjunction with a flight route display.

13. A computer-implemented method for integrating weather information into a graphical map display, the method comprising performing instructions under the control of one or more computer systems to perform the operations of:
   receiving weather information regarding a first geographic location and a second geographic location along a flight route;
   receiving a selection of a projected time of flight via a user-interface control, the projected time of flight corresponding to a time at which an aircraft is flying the flight route and is not positioned at the first geographic location or the second geographic location;
   parsing and interpreting the received weather information to determine weather conditions at the first geographic location and the second geographic location at a projected time of flight selected via the user-interface control;

determining a position of an aircraft along the flight route at the first time;

displaying the flight route on the graphical map display;

displaying a first representation of the aircraft at a position on the flight route corresponding to a geographic location of the aircraft at the first time;

displaying a first weather pictogram at a position on the graphical map display corresponding to the first geographic location and a second weather pictogram at a position on the graphical map display corresponding to the second geographic location, wherein the first weather pictogram comprises a first graphical element depicting past weather conditions at the first geographic location at the projected time of flight, a second graphical element adjacent to and abutting the first graphical element and depicting current weather conditions at the first geographic location at the projected time of flight, and a third graphical element adjacent to and abutting the second graphical element and depicting forecasted future weather conditions at the first geographic location at the projected time of flight;

receiving a selection of a second time via the user-interface control;

determining a position of the aircraft along the flight route at the second time;

displaying a second representation of the aircraft at a position on the flight route corresponding to a geographic location of the aircraft at the second time; and updating the first weather pictogram and the second weather pictogram corresponding to past, current, and forecasted future weather conditions at the first geographic location and the second geographic location at the second time.

14. The method of claim 13, wherein the first graphical element indicates the current weather conditions through a color-coding or shading associated with the current weather conditions, the second graphical element indicates the current weather conditions through a color-coding or shading associated with the future weather conditions, and the third graphical element indicates the past weather conditions through a color-coding or shading associated with the past weather conditions.

15. The method of claim 14, wherein the color-coding or shading associated with the current weather conditions, the future weather conditions, and the past weather conditions indicates flight rules in effect at the geographic location based on the current weather conditions, the future weather conditions, and the past weather conditions respectively.

16. The method of claim 13, wherein the time-encoded weather reports comprises a plurality of METAR reports, SPECI reports, TAFs, SIGMET advisories, or PIREPs regarding the geographic location.

17. The method of claim 13, wherein the time-encoded weather reports are received over ACARS.

\* \* \* \* \*